US012318349B2

(12) United States Patent
Huang et al.

(10) Patent No.: US 12,318,349 B2
(45) Date of Patent: Jun. 3, 2025

(54) INFLATABLE MASSAGE POOL

(71) Applicant: BESTWAY INFLATABLES & MATERIAL CORP., Shanghai (CN)

(72) Inventors: Shuiyong Huang, Shanghai (CN); Yunzhe Ban, Shanghai (CN); Qingshui Song, Shanghai (CN); Chenggen Liu, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 302 days.

(21) Appl. No.: 17/826,713

(22) Filed: May 27, 2022

(65) Prior Publication Data

US 2023/0381063 A1 Nov. 30, 2023

(30) Foreign Application Priority Data

Jul. 12, 2021 (CN) ......................... 202121570207.4

(51) Int. Cl.
*E04H 4/00* (2006.01)
*A61H 33/02* (2006.01)

(52) U.S. Cl.
CPC ......... *A61H 33/025* (2013.01); *E04H 4/0025* (2013.01)

(58) Field of Classification Search
CPC ............................ A61H 33/025; E04H 4/0025
USPC .......................................................... 4/541.1
See application file for complete search history.

(56) References Cited

U.S. PATENT DOCUMENTS 10,132,095 B2 * 11/2018 Liu ....................... E04H 4/0025
10,619,370 B2 * 4/2020 Huang .................. E04H 4/0025

FOREIGN PATENT DOCUMENTS

CN 203654813 6/2014
CN 209211974 * 8/2019
WO 2019148381 8/2019

OTHER PUBLICATIONS

Extended European Search Report dated Nov. 29, 2022 (Nov. 29, 2022) issued by the European Patent Office on related European patent 22179372.2.

* cited by examiner

*Primary Examiner* — Huyen D Le
(74) *Attorney, Agent, or Firm* — DICKINSON WRIGHT PLLC

(57) ABSTRACT

An inflatable pool includes a pool wall and a pool bottom which define a fluid accommodation cavity. The pool wall includes an inflatable chamber, and the pool bottom includes an outer bottom sheet and an inner bottom sheet. The inflatable pool further includes a wave-making channel arranged at the pool bottom and formed by enclosing strip strip connected to the inner bottom sheet and the outer bottom sheet respectively. The inner bottom sheet includes an inner annular rim connected to the outer bottom sheet to form the annular wave-making channel, and an outer annular rim of the inner bottom sheet is connected to the strip to form an overlapping region. Holes are formed through the overlapping region, and the wave-making channel is in fluid communication with the fluid accommodation cavity via the holes.

20 Claims, 4 Drawing Sheets

INFLATABLE MASSAGE POOL

CROSS-REFERENCE TO RELATED APPLICATION

This application claims priority from Chinese Application CN 202121570207.4, filed Jul. 12, 2021 in China, the disclosure of which is incorporated herein by reference in its entirety.

BACKGROUND

1. Field

Apparatuses and methods consistent with exemplary embodiments relate to an inflatable pool having a massage function.

2. Description of the Related Art

In inflatable massage pools or spa inflatable pools, a wave-making channel in the pool is generally inflated to a high pressure by means of an air pump, and the wave-making channel includes several holes therein to generate bubbles or water jets in the water, thereby achieving a massage effect.

In existing products, a wave-making channel is generally arranged on an inner wall of an inflatable pool or arranged at a junction of the inner wall and a pool bottom. No matter which arrangement manner is chosen for the wave-making channel, when an air chamber of the inflatable pool is inflated, the air chamber expands, causing the inner wall and the wave-making channel connected to the inner wall to deform sequentially, which may be detrimental to the generation of desired bubbles or water jet effect from the wave-making channel. Furthermore, edges of the multiple holes provided in the wave-making channel are continually pulled during the generation of bubbles or water jets, such that after long-term usage, undesired deformations or notches may appear at the edges of the holes, which is also detrimental to the generation of desired bubbles or water jet effect from the wave-making channel. If these holes are provided at the junction of the inner wall and the bottom of the inflatable pool, the undesired deformations or notches may cause ruptures at the junction.

SUMMARY

Example embodiments may address at least the above problems and/or disadvantages and other disadvantages not described above. Also, example embodiments are not required to overcome the disadvantages described above, and may not overcome any of the problems described above.

According to an aspect of an example embodiment, an inflatable pool comprises: a pool wall; a pool bottom comprising an outer bottom sheet and an inner bottom sheet, wherein the pool wall and the pool bottom together define a fluid accommodation cavity; an annular enclosing strip comprising a lower rim connected to an outer annular portion outer bottom sheet and an upper rim connected to an outer annular portion of the inner bottom sheet; wherein an inner annular portion of the inner bottom sheet is connected to an inner annular portion of the outer bottom sheet, such that a bottom channel is defined by the enclosing strip, a portion of the inner bottom sheet between the outer annular portion of the inner bottom sheet and the inner annular portion of the inner bottom sheet, and a portion of the outer bottom sheet between the outer annular portion of the inner bottom sheet and the inner annular portion of the outer bottom sheet; wherein a plurality of holes are formed through both the enclosing strip and the inner bottom sheet, in an overlapping region where the enclosing strip overlaps with the inner bottom sheet, and the bottom channel is in communication with the fluid accommodation cavity through the plurality of holes.

The pool may further comprise air inlet channel in fluid communication with the bottom channel and configured to supply pressurized air into the bottom channel.

The air inlet channel may comprise an air inlet pipe and an air inlet pocket comprising a first end connected to an opening in the bottom channel, and a second end comprising a fastener connected to the air inlet pipe.

The pool wall may comprise an inflatable chamber

The air inlet pipe may comprise a first end connected to the fastener and a second end configured to connect to an air pump; and the air inlet pipe traverses the inflatable chamber such that an airtightness of the inflatable chamber is maintained.

The pool may further comprise: an air inlet sleeve; wherein the pool wall comprises an inner side wall and an outer side wall, the inflatable chamber defined between the inner side wall and the outer side wall; and wherein a first end of the air inlet sleeve is connected to the inner side wall and a second end of the air inlet sleeve is connected to the outer side wall, the air inlet sleeve thereby defining defines a passage through which the air inlet pipe extends.

The pool may further comprise a porous elastic material is disposed within an accommodation space between the outer bottom sheet and the inner bottom sheet.

The inner bottom sheet may be sealed to the enclosing strip at edges of each of the plurality of holes.

The inner bottom sheet may be completely sealed to the enclosing strip over an entirety of the overlapping region.

According to an aspect of another example embodiment, an inflatable pool comprises: a pool wall; a pool bottom, wherein the pool wall and the pool bottom together define a fluid accommodation cavity, the pool bottom comprising a bottom sheet; a bottom channel sheet comprising an outer annular portion sealed to an outer annular portion of the bottom sheet and an inner annular portion sealed to an inner annular portion of the bottom sheet, such that a bottom annular channel is defined by the bottom sheet between the outer annular portion and the inner annular portion of the bottom cavity sheet and the bottom sheet between the outer annular portion of the bottom sheet and the inner annular portion of the bottom sheet; wherein the annular bottom channel sheet comprises an overlapping region, between the outer annular portion of the bottom channel sheet and the inner annular portion of the bottom channel sheet, the overlapping region comprising at least a first sheet layer sealed to a second sheet layer; wherein a plurality of holes are formed through both the first sheet layer and the second sheet layer in the overlapping region; and wherein the bottom annular channel is in communication with the accommodation cavity via the plurality of holes.

BRIEF DESCRIPTION OF THE DRAWINGS

The above and/or other aspects will become apparent and more readily appreciated from the following description of example embodiments, taken in conjunction with the accompanying drawings, in which.

DETAILED DESCRIPTION

Figure 1:
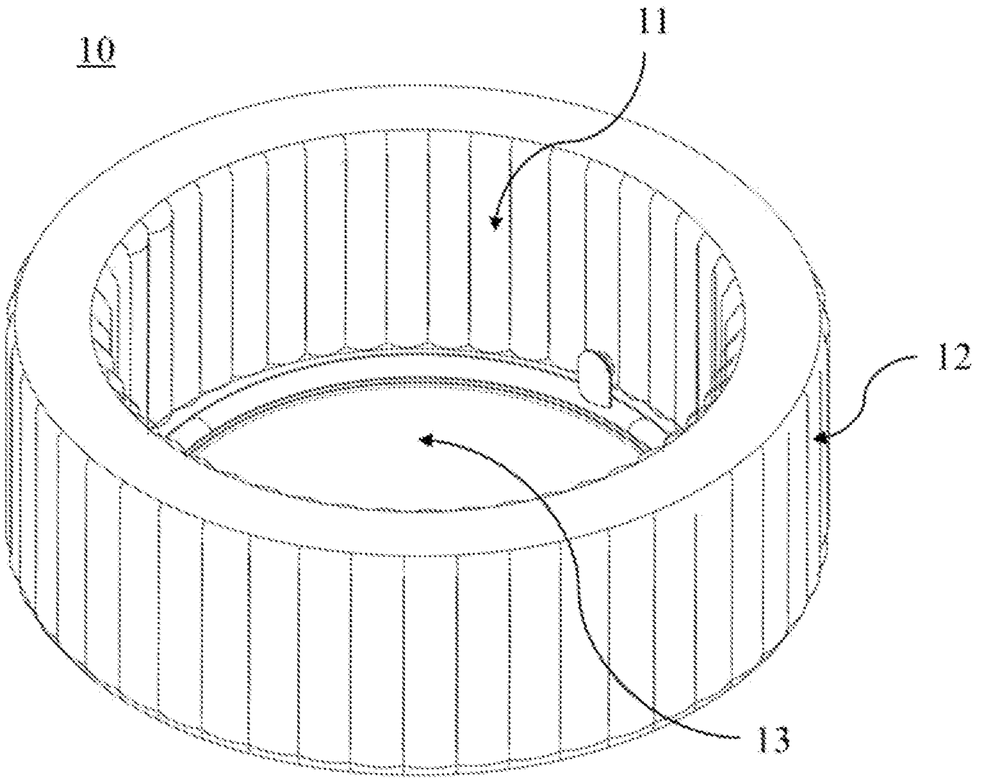
FIG. 1 is a perspective schematic diagram of an inflatable massage pool according to an example embodiment.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms “include,” “including”, “comprise, and/or “comprising,” when used in this specification, specify the presence of stated features, integers, steps, operations, elements, and/or components, but do not preclude the presence or addition of one or more other features, integers, steps, operations, elements, components, and/or groups thereof.

It will be further understood that, although the terms “first,” “second,” “third,” etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term “and/or” includes any and all combinations of one or more of the associated listed items. Expressions such as “at least one of,” when preceding a list of elements, modify the entire list of elements and do not modify the individual elements of the list.

Various terms are used to refer to particular system components. Different companies may refer to a component by different names—this document does not intend to distinguish between components that differ in name but not function.

Matters of these example embodiments that are obvious to those of ordinary skill in the technical field to which these exemplary embodiments pertain may not be described here in detail.

Figure 2:
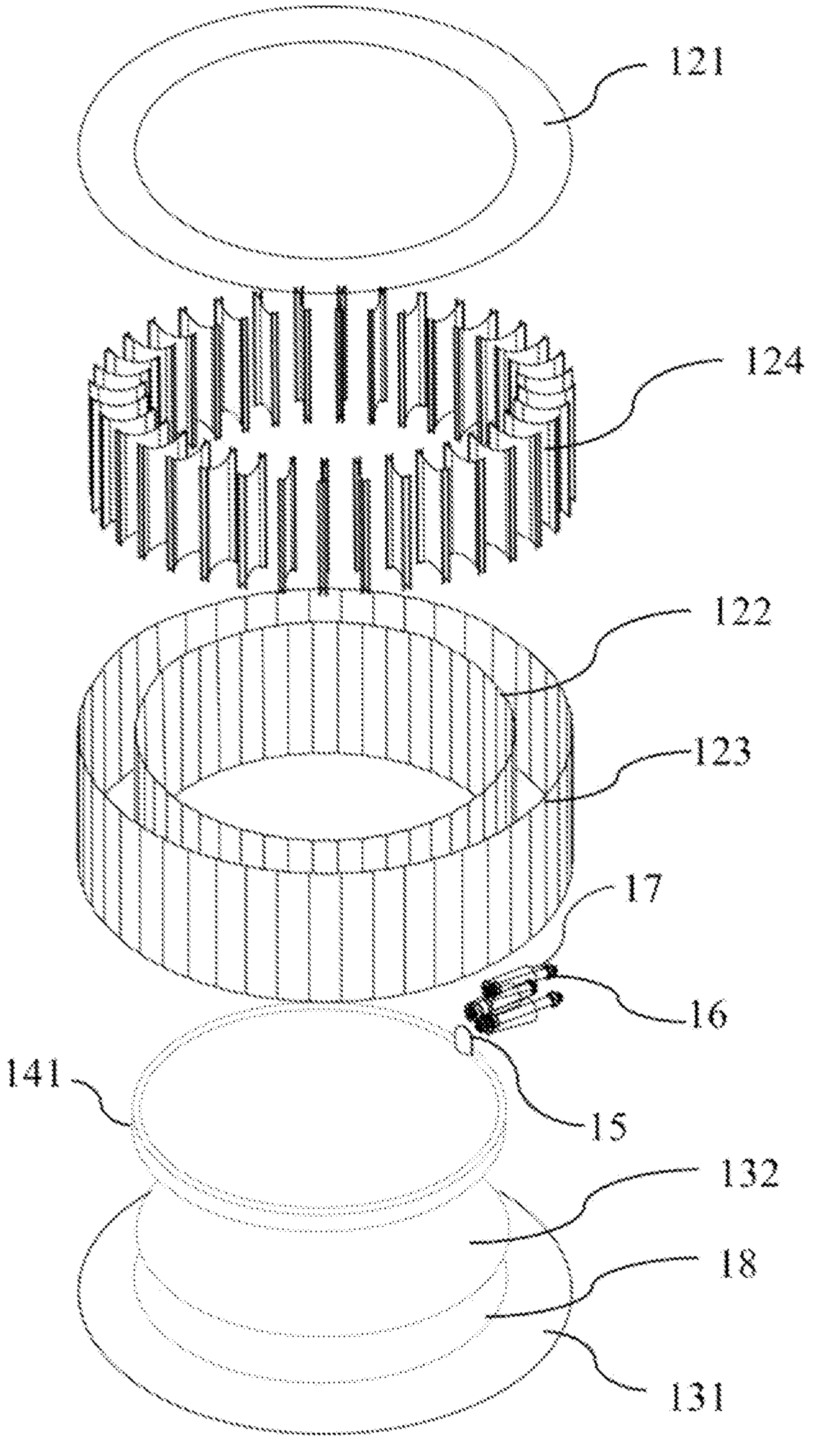
FIG. 2 is an exploded schematic diagram of the inflatable massage pool of FIG. 1.

Referring to FIGS. 1 and 2, an inflatable massage pool 10 comprises a fluid accommodation cavity 11. The fluid accommodation cavity 11 is, for example, used for accommodating fluid such as water, and the fluid accommodation cavity 11 is defined jointly by a pool wall 12 and a pool bottom 13, wherein the pool wall 12 comprises an inflatable chamber 120, and the pool bottom 13 comprises an outer bottom sheet 131 and an inner bottom sheet 132. As shown in conjunction with FIG. 3, the inflatable chamber 120 is formed by connecting a top sheet 121, an inner side sheet 122, an outer side sheet 123 and the outer bottom sheet 131, wherein an inner side wall and an outer side wall of the inflatable chamber 120 are respectively formed by the inner side sheet 122 and the outer side sheet 123. The inflatable chamber 120 is further internally provided with tensioning structures 124, with an inner side and outer side of each tensioning structure 124 being respectively connected to the inner side sheet 122 and the outer side sheet 123 so as to achieve a shaping effect during inflation of the inflatable chamber 120 and to form a decorative pattern on a visible surface of the inflatable massage pool 10. The inner side wall and the outer side wall of the inflatable chamber 120 may be integrally formed. For example, the top sheet 121, the inner side sheet 122 and the outer side sheet 123 may be integrally formed.

Figure 3:
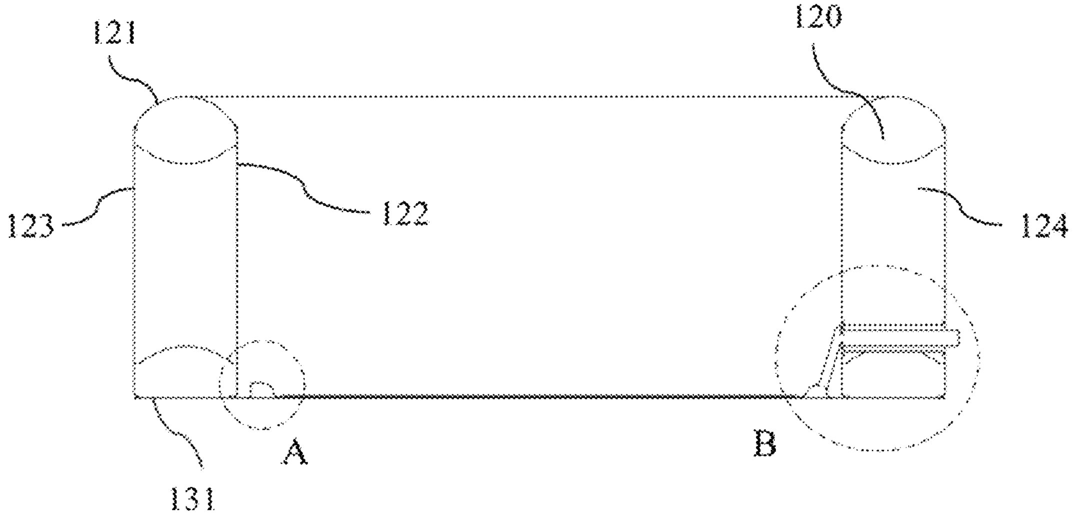
FIG. 3 is a cross-sectional schematic diagram of the inflatable massage pool of FIG. 1.
Figure 4:
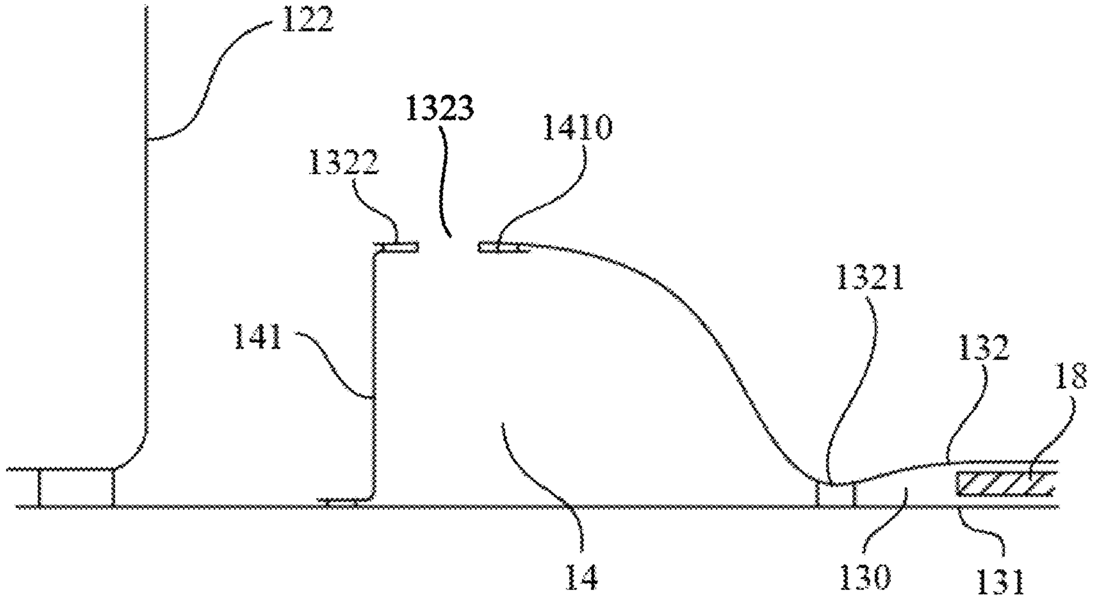
FIG. 4 is an enlarged schematic diagram of part A of FIG. 3.

As shown in conjunction with FIGS. 3 and 4, the pool bottom 13 of the inflatable massage pool 10 is further provided with a wave-making channel 14. Specifically, the wave-making channel 14 is formed by a strip 141 connected to the inner bottom sheet 132 and to the outer bottom sheet 131. The strip 141 may be an enclosing strip formed in the shape of a ring. Alternately, the strip 141 may be substantially annular, but may be open or broken. The diameter of an outer periphery of the inner bottom sheet 132 is smaller than a diameter of an outer periphery of the outer bottom sheet 131. A substantially central area of the inner bottom sheet 132 is connected to a substantially central area of the outer bottom sheet 131. An outer annular rim 1322 of the inner bottom sheet 132, disposed at or substantially at the outer periphery of the inner bottom sheet 132 is connected to an upper edge of the strip 141. An inner annular rim 1321 of the inner bottom sheet 132 is disposed at a dimeter smaller than the diameter of the outer annular rim 1322 and is connected to a portion of the outer bottom sheet 131. A lower side of the strip 141 is connected to the outer bottom sheet 131, so as to form an annular wave-making channel 14 having, but not limited to one of a circular or other curved annular shape, a square annular shape, and a rectangular annular shape. Alternately, the annular wave-making channel 14 may be an open or broken annular/ring shape. Thus, the annular portion between the inner annular rim 1321 and the outer annular rim 1322 of the inner bottom sheet 132, the strip 141, and a corresponding annular portion of the bottom sheet 131 are connected to each other to form the wave-making channel 14.

For the arrangement of wave-making holes in fluid communication with the wave-making channel 14, as shown with reference to FIG. 4, the outer annular rim 1322 of the inner bottom sheet 132 may be connected to the upper side of the strip 141 to form an overlapping region 1410, and the wave-making holes 1323 may be provided in the overlapping region 1410. The overlapping region 1410 is a region where a portion of the outer annular rim 1322 of the inner bottom sheet 132 overlaps with an upper portion of the strip 141, as shown in FIG. 3, and thus has a double-layer structure. The wave-making holes 1323 penetrate both layers of the double-layer structure and are pulled by the double-layer structure at the edges of the holes during aeration, ensuring that the wave-making holes 1323 will not be damaged after long-term use. The wave-making channel 14 is in fluid communication with the fluid accommodation cavity 11 via the wave-making holes 1323 so as to generate bubbles or jets in the fluid which is filled in the fluid accommodation cavity 11.

Figure 5:
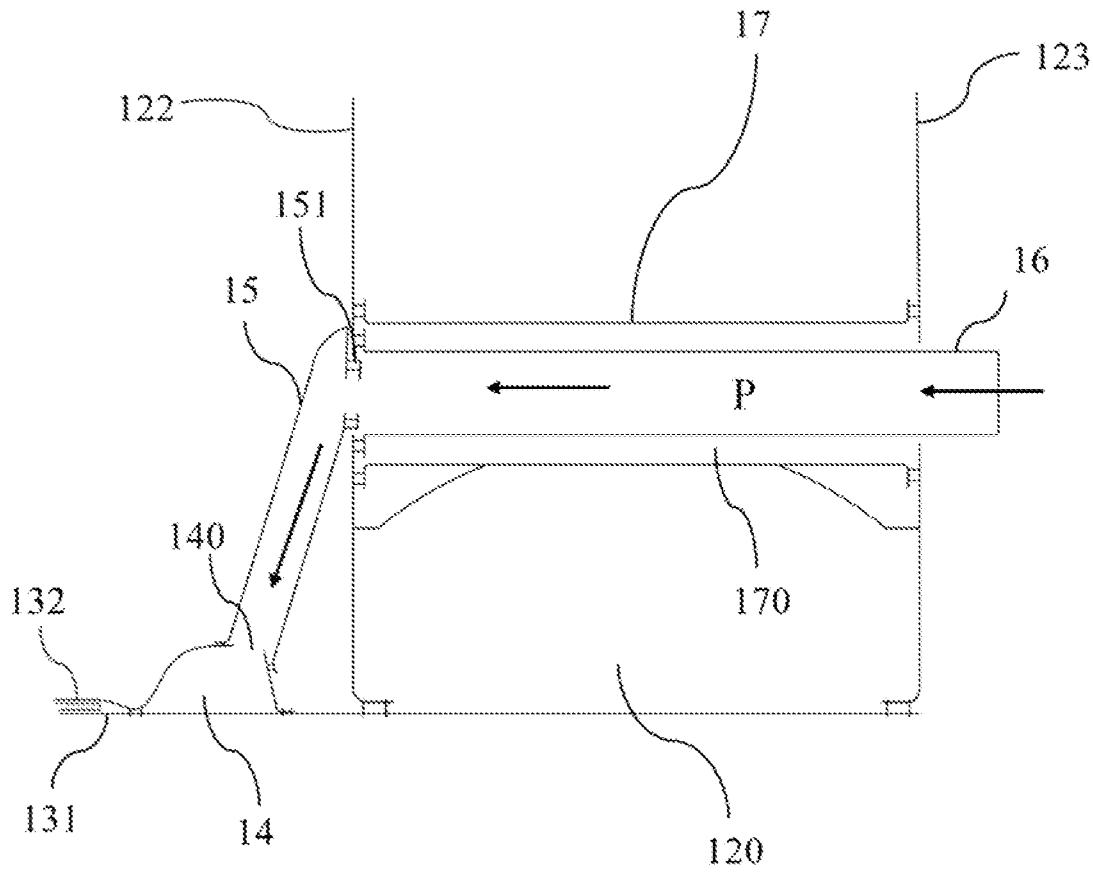
FIG. 5 is an enlarged schematic diagram of part B of FIG. 3.

With reference to an example embodiment shown in FIG. 5, the wave-making channel 14 is in fluid communication with an air inlet channel marked with arrows P, and the air inlet channel is used for supplying pressurized air into the wave-making channel 14. The air inlet channel comprises an air inlet pocket 15 and an air inlet pipe 16; the wave-making channel 14 is in fluid communication with the air inlet pipe 16 through the air inlet pocket 15 located above the wave-making channel; one end of the air inlet pocket 15 is connected to an opening 140 in the wave-making channel 14, and the other end of the air inlet pocket is provided with a fastener 151 connected to the air inlet pipe 16. The opening 140 in the wave-making channel 14 can be formed when the air inlet pocket 15 is connected to the wave-making channel 14 (for example, the opening 140 is formed when the air inlet pocket 15 is welded by fusion to the wave-making channel 14), or can be formed before the air inlet pocket 15 is connected to the wave-making channel 14. The air inlet pocket 15 may be made of polyvinyl chloride (PVC) material, with one end thereof being welded to the wave-making channel 14, and the other end thereof being attached to a fastener 151 by means of welding or direct injection molding. One end of the air inlet pipe 16 is connected to the fastener 151, and the other end thereof is connected to an air pump (not shown). The air inlet pipe 16 may penetrate the inflatable chamber 120 in a manner that maintains the airtightness of the inflatable chamber 120. The air inlet pipe 16 may, for example, pass through the inflatable chamber 120 and be connected to the air inlet pocket 15, so as to achieve the aesthetic effect of a simple structure and the functional effect of preventing entanglement of the pipeline in the fluid accommodation cavity 11.

The outer bottom sheet 131 of the wave-making channel 14 may be provided with an air inlet pocket in fluid communication with the wave-making channel 14, and the air inlet pocket may be connected to the air inlet pipe located below the pool bottom 13 and outside the pool; or, in order to avoid any deterioration in the comfort of stepping on the pool bottom, the air inlet pipe may be directly placed in the fluid accommodation cavity 11 from above the pool and may be connected to the air inlet pocket 15 shown in FIG. 5.

The air inlet pipe 16 may be constructed such as to not affect the airtightness of the inflatable chamber 120, in addition to the air inlet pipe 16 itself being connected, in a sealed manner, to the inner side sheet 122 and the outer side sheet 123 which form the inner side wall and the outer side wall, as shown in FIG. 5. The air inlet pipe 16 may be connected to the inflatable massage pool 10 via an air inlet sleeve 17, and inner and outer ends of the air inlet sleeve 17 may be respectively connected to the inner side sheet 122 and the outer side sheet 123 in a sealed manner, the air inlet sleeve 17 defining a channel 170 for the air inlet pipe 16 to pass through. The air inlet pipe 16 may be a plastic pipe or a PVC pipe, the outer wall of the air inlet pipe 16 may be directly welded to the inner side sheet 122 and the outer side sheet 123 which may also be made of PVC material and connected to the fastener 151 of the air inlet pocket 15. Alternately, the air inlet pipe 16 may pass through the channel 170 formed by the air inlet sleeve 17 and may then be connected to the inner side sheet 122 in a sealed manner, so as to ensure that the water in the fluid accommodation cavity 11 will not leak out. The air inlet sleeve 17 may be made of PVC material, with opposite ends thereof being welded to the inner side sheet 122 and the outer side sheet 123. The arrangement of the air inlet sleeve 17 facilitates installation of the air inlet pipe 16, and there may be a certain space for the air inlet pipe 16 to move in the channel 170 of the air inlet sleeve 17, reducing the influence of the air inlet pipe 16 on the shape of the inflatable chamber 120.

As shown in FIG. 2, the inflatable massage pool 10 may further comprise other pipelines such as a water inlet pipe or a water outlet pipe, and these pipelines may also be connected, via sleeves, to the inner side wall and the outer side wall which define the inflatable chamber. Pipelines which are adjacent to the air inlet pipe 16 and may share a same sleeve member.

As shown in conjunction with FIGS. 2, 4 and 5, an accommodation space 130 (FIG. 4) may defined between the outer bottom sheet 131 and the inner bottom sheet 132. The accommodation space 130 is demarcated by the junction of the inner annular rim 1321 of the inner bottom sheet 132 and the outer bottom sheet 131 and may be internally provided with a porous elastic material 18. The porous elastic material 18 may be any one or more of a number of materials including, but not limited to, an expanded polyethylene (EPE) material and a sponge material so as to provide a comfortable feeling for a foot stepping and to also provide thermal insulation.

According to one or more example embodiments, an inflatable massage pool comprising a wave-making channel that utilizes a pool bottom structure, may be made using a simple manufacturing process and this process and structure may be applicable to inflatable pools of any number of different shapes, compared to a wave-making channel provided on the side wall of the pool. Still further, the wave-making holes of the wave-making channel may be arranged in the overlapping region of the sheets that form the wave-making channel, such that the whole wave-making channel is not likely to be damaged at the wave-making holes.

According to an example aspect, at edges of the wave-making holes, the inner bottom sheet 132 may completely abut the strip 141, the abutting either completed before the wave-making holes are formed, or completed by means of fusion welding when the wave-making holes are formed, so as to prevent the inner bottom sheet 132 and the strip 141 from being separated from each other or delaminated at the wave-making holes, thereby ensuring that the wave-making holes provide a stable bubble effect or water jets.

According to another example aspect, the outer annular rim 1322 of the inner bottom sheet 132 may completely abuts the strip 141 in the entire overlapping region 1410, for example, by means of welding to achieve complete connection, which may ensure the sealing at the junction, and also may enhance a strength of the overlapping region 1410 as a whole.

It may be understood that the exemplary embodiments described herein may be considered in a descriptive sense only and not for purposes of limitation. Descriptions of features or aspects within each exemplary embodiment may be considered as available for other similar features or aspects in other exemplary embodiments.

While exemplary embodiments have been described with reference to the figures, it will be understood by those of ordinary skill in the art that various changes in form and details may be made therein without departing from the spirit and scope as defined by the following claims.

What is claimed is:

1. An inflatable pool comprising:
- a pool wall;
- a pool bottom defining a fluid accommodation cavity with the pool wall and comprising:
  - an outer bottom sheet including an outer annular portion and an inner annular portion;
  - an inner bottom sheet including an outer annular portion and an inner annular portion, the inner annular portion connected to the inner annular portion of the outer bottom sheet;
- a strip comprising:
  - a lower rim connected to the outer annular portion of the outer bottom sheet; and
  - an upper rim welded to the outer annular portion of the inner bottom sheet to form an overlapping region;
- a plurality of holes formed in the overlapping region of the strip and the inner bottom sheet; and
- a bottom channel defined by the strip, the inner bottom sheet, and the outer bottom sheet, the bottom channel being in communication with the fluid accommodation cavity through the plurality of holes.

2. The inflatable pool according to claim 1, further comprising an air inlet channel in fluid communication with the bottom channel and configured to supply pressurized air into the bottom channel.

3. The inflatable pool according to claim 2, wherein the air inlet channel comprises an air inlet pipe and an air inlet pocket comprising a first end connected to an opening in the bottom channel, and a second end comprising a fastener connected to the air inlet pipe.

4. The inflatable pool according to claim 2, wherein the air inlet channel comprises an air inlet pipe and an air inlet pocket comprising a first end connected to an opening in the bottom annular channel and a second end comprising a fastener connected to the air inlet pipe.

5. The inflatable pool according to claim 1, wherein the pool wall comprises an inflatable chamber.

6. The inflatable pool according to claim 5, wherein the air inlet pipe comprises a first end connected to the fastener and a second end configured to connect to an air pump; and wherein the air inlet pipe traverses the inflatable chamber such that an airtightness of the inflatable chamber is maintained.

7. The inflatable pool according to claim 6, further comprising:

an air inlet sleeve;

wherein the pool wall comprises an inner side wall and an outer side wall, the inflatable chamber defined between the inner side wall and the outer side wall; and wherein a first end of the air inlet sleeve is connected to the inner side wall and a second end of the air inlet sleeve is connected to the outer side wall, the air inlet sleeve thereby defining defines a passage through which the air inlet pipe extends.

8. The inflatable pool according to claim 1, further comprising a porous elastic material is disposed within an accommodation space between the outer bottom sheet and the inner bottom sheet.

9. The inflatable pool according to claim 8, wherein the inner bottom sheet is completely sealed to the strip over an entirety of the overlapping region.

10. The inflatable pool according to claim 1, wherein the inner bottom sheet is sealed to the strip at edges of each of the plurality of holes.

11. An inflatable pool comprising:

a pool wall;

a pool bottom, wherein the pool wall and the pool bottom together define a fluid accommodation cavity, the pool bottom comprising a bottom sheet;

a bottom channel sheet comprising an outer annular portion sealed to an outer annular portion of the bottom sheet and an inner annular portion sealed to an inner annular portion of the bottom sheet, such that a bottom annular channel is defined by the bottom sheet between the outer annular portion and the inner annular portion of the bottom cavity sheet and the bottom sheet between the outer annular portion of the bottom sheet and the inner annular portion of the bottom sheet;

wherein the annular bottom channel sheet comprises an overlapping region, between the outer annular portion of the bottom channel sheet and the inner annular portion of the bottom channel sheet, the overlapping region comprising at least a first sheet layer sealed to a second sheet layer;

wherein a plurality of holes are formed through both the first sheet layer and the second sheet layer in the overlapping region of the strip and inner annular portion of the bottom sheet; and wherein the bottom annular channel is in communication with the accommodation cavity via the plurality of holes.

12. The inflatable pool according to claim 11, further comprising an air inlet channel in fluid communication with the bottom annular channel and configured to supply pressurized air into the bottom annular channel.

13. The inflatable pool according to claim 11, wherein the pool wall comprises an inflatable chamber.

14. The inflatable pool according to claim 13, wherein the air inlet pipe comprises a first end connected to the fastener and a second end configured to connect to an air pump; and wherein the air inlet pipe traverses the inflatable chamber such that an airtightness of the inflatable chamber is maintained.

15. The inflatable pool according to claim 14, further comprising:

an air inlet sleeve;

wherein the pool wall comprises an inner side wall and an outer side wall, the inflatable chamber defined between the inner side wall and the outer side wall; and wherein a first end of the air inlet sleeve is connected to the inner side wall and a second end of the air inlet sleeve is connected to the outer side wall, the air sleeve thereby defining a passage through which the air inlet pipe extends.

16. The inflatable pool according to claim 11, wherein the bottom sheet comprises an inner bottom sheet and an outer bottom sheet; and wherein the inflatable pool further comprises a porous elastic material disposed within an accommodation space between the inner bottom sheet and the outer bottom sheet.

17. The inflatable pool according to claim 11, wherein the first sheet layer is sealed to the second sheet layer at edges of each of the plurality of holes.

18. The inflatable pool according to claim 17, wherein the first sheet layer is completely sealed to the second sheet layer over an entirety of the overlapping region.

19. An inflatable pool comprising:

a pool wall;

a pool bottom defining a fluid accommodation cavity with the pool wall and comprising:

an outer bottom sheet including an outer annular portion and an inner annular portion;

an inner bottom sheet including an outer annular portion and an inner annular portion, the inner annular portion connected to the inner annular portion of the outer bottom sheet;

a strip comprising:

a lower rim connected to the outer annular portion of the outer bottom sheet; and an upper rim welded to the outer annular portion of the inner bottom sheet to form an overlapping region;

a plurality of holes formed in the overlapping region of the strip and the inner bottom sheet; and a bottom channel defined by the strip, the inner bottom sheet, and the outer bottom sheet, bottom channel being in communication with the fluid accommodation cavity through the plurality of holes;

wherein the inner bottom sheet is sealed to the strip at edges of each of the plurality of holes.

20. The inflatable pool according to claim 19, wherein the inner bottom sheet is completely sealed to the strip over an entirety of the overlapping region.

* * * * *